United States Patent Office 3,468,973
Patented Sept. 23, 1969

3,468,973
COPOLYMER COMPOSITION FOR COATING
AND IMPREGNATING PURPOSES
William D. Emmons, Huntingdon Valley, Andrew
Mercurio, Elkins Park, Pa., assignors to Rohm &
Haas Company, Philadelphia, Pa., a corporation of
Delaware
No Drawing. Continuation of application Ser. No.
327,105, Nov. 29, 1963, now Patent No. 3,342,893,
dated Sept. 19, 1967. This application Jan. 18,
1966, Ser. No. 521,425
Int. Cl. C08f 37/16; C08g 37/32
U.S. Cl. 260—851
19 Claims

ABSTRACT OF THE DISCLOSURE

This invention relates to novel compositions adapted to be used for coating and impregnating purposes, which comprise a solution of a mixture of (A) a water-insoluble addition copolymer of monoethylenically unsaturated monomers, at least one of the monomers being an amide of the formula —CONHR, where R is H, alkyl, hydroxyalkyl, or alkoxylalkyl, or a free hydroxyl-containing ester, and (B) an alkylated condensate of formaldehyde and a diamide of a dicarboxylic acid.

This application is a continuation of our copending application Serial No. 327,105 filed November 29, 1963, now United States Patent 3,342,893, granted September 19, 1967. The present invention concerns novel thermosetting compositions adapted to be used for coating and impregnating purposes. It is particularly concerned with this type of composition for the decoration and protective coating of metals which are subjected to both indoor and outdoor use and exposure.

United States Patent No. 2,364,737 to McGrew discloses the preparation of various ethers of N-methylol polycarbonamides. Among the polyamides mentioned are several unsaturated compounds such as terephthalamide and fumaramide, a number of saturated aliphatics such as adipamide, azelamide, sebacamide and hexahydroterephthalamide, and various other diamides which in general are comparatively expensive and unavailable commercially. In general, the derivatives disclosed in the patent are distinctive N,N'-bis(alkoxymethyl) derivatives of the respective diamides. They have one or more deficiencies or disadvantages, such as inadequate resistance of coatings obtained from compositions comprising them toward moisture, solvents, or heat; lack of durability on outdoor exposure; poor solubility in conventional solvents; tendency to crystallize out of solution on standing or storage even over a short period of time, such as from 1 to 6 hours; poor or limited compatibility with other resinous or resin-forming components of coating or impregnating compositions, such as aminoplasts, phenoplasts, alkyds, or polyepoxide resins; and impracticality from a commercial standpoint because of inordinate cost or unavailability. The ethers taught by McGrew are disclosed as being useful in forming resins with polyhydric compounds or in modifying alkyd and urea-formaldehyde resins. In these compositions, the ethers are disclosed as improving the flexibility of the resulting product.

Now, in accordance with the present invention, it has been discovered that certain specific classes of acrylic resins modified by various ethers of N-methylol polycarbonamides are characterized by an unusual combination of hardness, flexibility and adhesion. Further, these compositions have, as compared to similar compositions containing the ethers (1) of the N-methylol monomeric polyamides and (2) of the N-methylol derivatives of the previously known linear polyamide condensation polymers, the advantages of providing greater ease of solution and solubility in a wider range of solvents, greater solution concentrations and consequently more facile preparation of coatings of adequate thickness with a single application, a wider range of compatibilities, and greater uniformity of the films obtained on coating and impregnation.

The compositions of the present invention comprise a solution in an organic solvent of a mixture of (A) About 70 to 95% by weight of a water-insoluble addition copolymer of monoethylenically unsaturated monomers comprising at least one derivative of an alpha, beta-mono-ethylenically unsaturated acid selected from the group consisting of (1) amides having a group of the formula

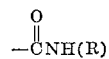

wherein R is selected from the group consisting of H, alkyl groups having 1 to 4 carbon atoms, hydroxyalkyl groups having 1 to 4 carbon atoms, and alkoxyalkyl groups having 2 to 6 carbon atoms, and (2) free hydroxyl-containing esters, and (B) About 5 to 30% by weight of an alkylated condensate of formaldehyde and a diamide of a dicarboxylic acid having 4 to 12 carbon atoms, the alkylation being that obtained with at least one alcohol having 1 to 8 carbon atoms.

When the derivative of the alpha,beta-monoethylenically unsaturated acid is an amide, it is preferred that such amide comprise about 3 to 20% by weight of the copolymer. Conversely, when the derivative is a free hydroxyl-containing ester, it is preferred that the hydroxyl-containing ester comprise about 5 to 40% by weight of the copolymer.

Copolymer of monoethylenically unsaturated monomers

The unsaturated acids from which the amide and/or ester is derived may be monocarboxylic or polycarboxylic. Examples include acrylic, methacrylic, itaconic, maleic, fumaric, crotonic, alpha-hydroxyalkyl-acrylic, aconitic, citraconic, alpha-acryloxyacetic, and alpha-methacryloxy-propionic. Representative amides include acrylamide, methacrylamide, itaconamide, itaconamic acid, maleamic acid, fumaramic acid, the N-methylol derivatives of any of these amides, the N-methyl to N-butyl-substituted derivatives of any of these amides, the N-beta-hydroxyethyl, the N-beta-hydroxypropyl, and other N-hydroxypropyl and N-hydroxybutyl-substituted derivatives of the first-named amides, and the N-methoxymethyl, N-butoxymethyl, N-ethoxyethyl, and other N-alkoxyalkyl-substituted derivatives of the first-named amides. Preferred amides are acrylamide, methacrylamide and itaconamide, which preferably will comprise from about 5 to 10% by weight of the copolymer.

Representative esters include 2-hydroxyethyl acrylate, methyl alpha-(hydroxymethyl) - acrylate, ethyl alpha-(hydroxymethyl)-acrylate, butyl alpha-(2-hydroxyethyl)-acrylate, 2-hydroxypropyl acrylate or methacrylate, 3-hydroxypropyl acrylate or methacrylate, methyl alpha-(2-hydroxypropyl)-acrylate, ethyl alpha - (3 - hydroxypropyl)-acrylate, 4-hydroxybutyl acrylate, 5-hydroxyamyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3 - hydroxypropyl crotonate, 5-hydroxyamyl crotonate, 6 - hydroxyhexyl crotonate, 7-hydroxyheptyl crotonate, 10 - hydroxydecyl crotonate, di(2-hydroxyethyl)maleate, di(4-hydroxybutyl) maleate, di(6-hydroxyhexyl)maleate, di(9-hydroxynonyl) maleate, di(10-hydroxydecyl)maleate, di(2-hydroxyethyl)

fumarate, di(4-hydroxybutyl)fumarate, di(6 - hydroxyhexyl)fumarate, di(10-hydroxydecyl)fumarate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crotonate, 6,10-dihydroxydecyl methacrylate, di-2,6-dihydroxyhexyl maleate, and di-2-chloro 7-hydroxyheptyl fumarate. In all of the hydroxy-containing esters, the hydroxyl of each hydroxyalkyl group is at least two carbon atoms removed from the carbon atom of the adjacent —COO— radical in the ester.

The amide and/or hydroxy-containing ester may be copolymerized with one or more other copolymerizable monomers, such as the nitriles and esters of acrylic or methacrylic acid which may be generically represented by the formula

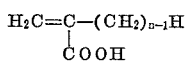

wherein $n$ is an integer having a value of 1 to 2. The esters may be those of benzyl alcohol or of any saturated monohydric alcohol having 1 to 18 or more carbon atoms, including cyclohexanol, alkyl-substituted cyclohexanols and alkanols having up to 18 or more carbon atoms and preferably from 1 to 8 carbon atoms. Examples include methyl acrylate, methyl methacrylate, ethyl acrylate, butyl acrylate, butyl methacrylate, 2-ethyl-hexyl acrylate and octadecyl acrylate. Other monomers that can be used include vinyl esters, such as vinyl acetate and vinyl chloride, vinylidene chloride, vinyl aromatic hydrocarbons having 8 to 16 carbon atoms, especially styrene and the vinyl-toluenes (o, m, p, or mixtures), vinyl $(C_1-C_4)$-alkyl ethers, such as vinyl ethyl ether, and vinyl $(C_1-C_4)$-alkyl sulfides, such as vinyl methyl sulfide. In general, the monomers copolymerized with the amide or hydroxyl-containing component should be hydrophobic as those mentioned herein. However, the copolymer may include from 1 to 10%, preferably not over 5%, by weight of hydrophilic monomers other than the amide or hydroxyl ester component. Examples include acids, such as acrylic acid, methacrylic acid, or itaconic acid; amines, such as dimethylaminoethyl acrylate or N - dimethylaminoethyl acrylamide; etc.

In general, the copolymers are made by solution polymerization in an organic solvent which can then constitute part of the solvent in the final coating or impregnating composition. Examples include the aromatic hydrocarbons, such as benzene, toluene, and xylene; the alcohols, such as n-butanol, sec-butanol, tert-butanol, pentanols, hexanol, and cyclohexanol; ketones such as methyl isobutyl ketones; ethers such as dioxane; and esters, such as 2-ethoxyethyl acetate. A mixture of solvents may be used. Solvent interchange can also be used whereby the solvent used in preparation is replaced by another solvent for use in the coating composition.

Preferably, the molecular weight of the polymers is at least 800 and may be up to 150,000 viscosity average or higher. The preferred copolymers have molecular weights in the range of about 5,000 to 30,000 viscosity average. Known methods are used to produce the copolymers of the desired molecular weight.

Alkylated diamide/formaldehyde condensate

The alkylated diamide/formaldehyde condensate may be composed essentially of specific compounds such as the N,N'-dialkoxymethyl derivative of any of the diamides set out herein. Examples of the diamides are those formed from succinic acid, adipic acid, glutaric acid, sebacic acid, isophthalic acid or anhydride, tetrahydrophthalic acid or anhydride, and 1,2-cyclohexanedicarboxylic acid or anhydride. On the other hand, preferred compositions are those comprising a mixture of such compounds or a mixture of essentially amorphous, partially polymerized or partially resinified condensates of this type, whether derived from single diamide and a single alcohol or from a mixture of either or both of these component materials. The preparation of the alkylated diamide/formaldehyde condensates is set forth in detail in our copending application, Ser. No. 327,105 filed Nov. 29, 1963, which disclosure is incorporated herein.

The alkylated condensates used in the compositions of the present invention are made in an initially aqueous alcoholic medium comprising at least one alcohol having from 1 to 8 carbon atoms, such as methanol, ethanol, n-propanol, isopropanol, n-butanol, n-pentanol, n-hexanol, and cyclohexanol. Preferred condensates are those obtained from a monohydric $(C_4-C_8)$ alcohol having a branched structure or from an alcoholic material in which the predominant proportion of the alcohol content consists of such an alcohol. Examples of the latter alcohols include cyclohexanol and such secondary alkanols as sec-butanol, 2-hydroxypentane, 3-hydroxypentane, 2-hydroxy-3 - methylbutane, 2 - hydroxyhexane, 3 - hydroxyhexane, 2-hydroxy-4-methylpentane, 3-hydroxy-4 - methylpentane, 2-hydroxyoctane, 3-hydroxyoctane, 2-ethylhexanol and 2-hydroxy-3,3-dimethylbutane. In preferred compositions, the alcoholic component is constituted by at least about 55% by weight of a branched $(C_4-C_8)$-alcohol or of a mixture of these alcohols, and is preferably formed of at least 75 to 95% or even 100% of these alcohols, any proportion of other $(C_1-C_8)$-alcohol such as ethanol, n-propanol, isopropanol, n-butanol, etc., being not over 45%. Mixtures of such alcohols, and especially of the branched alkanols, are generally preferred as they are generally most reliable in producing alkylated diamide/formaldehyde condensates which remain amorphous over long periods of time on standing in storage under normal conditions of temperature and humidity. The branched $C_8$ alcohols, and especially 2-ethylhexanol, are particularly preferred.

The alcohol may be supplemented with another solvent of inert character, such as aliphatic, naphthenic, or aromatic hydrocarbons, including mineral spirits, solvent naphthas, benzene, toluene, and xylenes. The last-mentioned solvent may serve to aid in the removal of the water formed during the second stage of the reaction through azeotropic distillation. While hydrocarbons are generally used, the invention is not restricted thereto and any inert solvent may be used to supplement the alcohol. However, the product need not be freed of water entirely. In many instances, it has been found that the presence of a small amount of residual or subsequently added water aids in stabilizing the product and in preventing the alkylated diamide/formaldehyde condensate from crystallizing out of the product which is in the form of a solution thereof.

Before cooling the reaction product, solvent may be stripped out by distillation to provide any desired solids concentration which may be about 30% to as high as 80% or higher by weight, though preferably from abut 40 to 70%. The solvent used during the reaction may also be stripped and replaced in whole or part by another solvent. After cooling, and filtering, if desired, the reaction product may be diluted for use to any lower solids concentration, such as to 1 to 5%. Other solvents (besides the alcohols and hydrocarbons mentioned) that may be used include acetone, dioxane, methyl isopropyl ketone, the mono-$(C_1-C_4)$ alkyl and di-$(C_1-C_4)$ alkyl ethers of ethylene glycol, the monoacetate of dethylene glycol, etc.

Particularly preferred condensation products are those defined by the following formula:

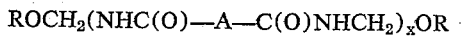

wherein

A is a meta-phenylene group;
R is at least one member selected from the group consisting of H and the radicals of alcohols having from 1 to 8 carbon atoms; and $x$ is a number having a value of 1.5 to 3, and preferably from 1.8 to 2.5, R being an alcohol radical in at least a portion of the condensation product.

It is apparent from the formula that the condensate may be a simple dimer when $x$ is 2 and a simple trimer when $x$ is 3 and the invention includes the pure dimer and the pure trimer. However, in general, the condensate is a mxture of two or more simple compounds in each of which $x$ has a value of 1, 2, 3 or more, and hence the value of $x$ for a given composition is actually an average value, i.e., a number representing the average of the value of the several components making up the mixture. The radical R may be that of a single alcohol or it may be different in the various components making up the mixture. It may be the radical of one or more alcohols in part of the condensate and hydrogen in another part of the condensate. Preferably, at least 75% up to 100% of the R constituent in the entire condensation product is the radical or radicals of one or more alcohols as defined.

Alkylated melamine/formaldehyde condensate

Coating compositions prepared according to the invention comprise (A) an alkylated diamide/formaldehyde condensate and (B) a resin, which may be a copolymer of an amide and/or a free hydroxyl-containing ester of an alpha,beta-monoethylenically unsaturated acid. In addition, preferred compositions of the invention contain (C) an alkylated melamine/formaldehyde condensate obtained from at least one saturated monohydric alcohol having 1 to 6 carbon atoms. The relative proportions between the diamide condensate and the melamine condensate are from 70 to 95% by weight of the former and 30 to 5% by weight of the latter. In the composition there is from 70 to 95% by weight of resin (B) and 30 to 5% by weight of the mixture of condensates (A) and (C). Component (C) has the advantage of reducing the tendency to discolor in the event of overbaking.

The melamine condensate may be that of melamine itself or melamine-substituted on the amine nitrogen atoms with up to two alkyl groups having 1 to 4 carbon atoms. Of the substituted melamines, the dimethyl-substituted melamines are generally preferred. The melamine-formaldehyde condensate may contain from 2 to 6 methylol groups and from 2 to 6 of these groups may be alkylated by a monohydric alcohol, such as methanol, n-butanol, cyclohexanol, sec-butanol, sec-amyl alcohols, etc.

Coating compositions

The organic solvent in which the several components are dissolved may simply be an alcohol of suitable volatility, such as ethanol, n-propanol, isopropanol, n-butanol, sec-butanol, tert-butanol, cyclohexanol or mixtures thereof, or it may be formed of such other inert solvents as the aliphatic, naphthenic, or aromatic hydrocarbons, of which xylene, toluene, benzene, solvent naphthas, and mineral thinners are typical, ketones, such as acetone and methyl isobutyl ketone, ethers such as dioxane, the monomethyl and monoethyl ethers of ethylene glycol and esters such as the acetate of one of the monoethers just mentioned, etc. Any alcohol present in the solvent medium may be the same as or different from that present in one of the alkylated condensates.

The composition may comprise dyes, pigments, fillers, ultraviolet stabilizers, anti-oxidants, delustrants, plasticizers, and any other compatible film-forming components, which latter may be of thermoplastic or thermosetting character. Examples of film-forming components include polyepoxides, cellulose derivatives, phenoplasts, other aminoplasts, such as alkylated urea-formaldehyde and alkylated N,N'-ethyleneurea/formaldehyde condensates, vinyl resins, including poly(vinyl alcohol) and partially hydrolyzed poly(vinyl acetate), etc.

In applying the coating and impregnating compositions, whether or not they contain other binder materials, it is generally desirable, though not absolutely essential, to provide the composition with a curing catalyst of acidic character or a "latent" catalyst which develops acidity on heating during the baking operation. The amount of catalyst may be from 0.1 to 7% by weight, based on the weight of total solids, the higher proportions not ordinarily being needed except when the compositions contain a large proportion of pigment and/or filler. Examples of curing catalysts include the so-called Lewis acids such as zinc fluoborate, zinc perchlorate, aluminum chloride, ferric chloride, stannic chloride, titanium chloride, the corresponding bromides such as aluminum bromide and so forth, and boron trifluoride, especially its complexes such as with ethyl ether. There may also be used such acids as sulfuric acid, phosphoric acid, butylphosphoric acid, chlorosulfonic acid, alkyl or aromatic sulfonic acids such as o- or p-toluenesulfonic acid, or methanesulfonic acid, polyphosphoric acid, formic acid, maleic acid, oxalic acid and such latent catalysts as the monosalts of maleic or other acid with a tertiary amine such as triethylamine, triethanolamine and so on.

The compositions of the present invention are especially useful in the preparation of baking enamel-type coating compositions for decorating and finishing rigid substrates, such as metals and wood, for example as automotive finishes where outdoor durability is important.

The coatings may be applied to all sorts of surfaces for a wide variety of purposes such as in metal decorating, providing protective coatings on aluminum siding, finishing metal furniture and cabinets, household appliances, etc. They are particularly desirable for application to primed surfaces of metals, such as iron, steel, copper, brass, aluminum, chromium, nickel, and the like; to glass, porcelain and other vitreous materials; to articles made of plastic materials, wood, textile fabrics, leather, paper, cardboard, and so on.

The concentration of the solution may vary widely from as low as about 1% solids to 75% solids, depending on the nature of substrate to which it is to be applied, the purpose of application, i.e., whether it is intended to penetrate or is intended to provide a more or less thick protective coating, and the manner of application, e.g., by dipping, brushing, spraying, or roll-transfer.

After application of the composition to a surface, it may be allowed to dry by exposure to normal atmospheric air currents. Alternatively, it may be dried by application of heated air, by application of infrared rays, radio frequency currents, or in any other suitable manner. After or during drying, curing is effected by heating to a temperature of about 105° to 400° C. or higher, but preferably from 125° to 150° C., for a period of time that generally is inversely proportional to the temperature and may be from about 10–15 seconds in the upper portion of the temperature range to an hour or so near the lower portion thereof. For example, 30 minutes at 150° C. is a quite practical combination. The combined factors of temperature and time depend, among other things as well, upon the particular solvent used and the thickness of coating.

In the following examples, which are illustrative of the invention, the parts and percentages are by weight unless otherwise indicated:

Example 1

(a) To 100 parts of a 50% copolymer solution in 3/1 xylene/diacetone alcohol (the copolymer was produced by the solution copolymerization of 19.5 parts methyl methacrylate, 15.5 parts styrene, 60 parts ethyl acrylate, 3 parts acrylamide, and 2 parts methacrylic acid) were added 7.9 parts of a 70% solution in sec-butanol of a condensation product of adipamide, formaldehyde, and sec-butanol (the preparation of which is described in detail in part (b) of this example) and 0.3 part of a 30% solution of p-toluenesulfonic acid in isopropanol. This composition was cold blended and then spread onto cold-rolled steel to a 1.5 mil dry film thickness and baked at 300° F. for 30 minutes. For comparison, a clear coating of the 50% copolymer solution alone was also spread onto cold-rolled steel to a 1.5 mil dry film thickness and baked at 300° F. for 30 minutes.

The clear coating containing the adipamide condensate had an "H" pencil hardness, 30 inch-lbs. of reverse impact resistance, was insoluble in xylene and in 2-ethoxyethyl acetate and showed only slight tack when heated at 180° F. in contact with cheesecloth under a load of 2 p.s.i. The control had an "HB" pencil hardness, less than 2 inch-lbs. of reverse impact resistance, was soluble in xylene and in 2-ethoxyethyl acetate and showed a very heavy print when heated at 180° F. in contact with cheesecloth.

(b) Preparation of adipamide/HCHO/sec-butanol condensate

Charge:
(A) Adipamide (3 moles) _____ g__ 432
(B) Paraformaldehyde (91%) (9 moles) _g__ 300
(C) sec-Butanol (12 moles) _____ g__ 888
(D) Formic acid (98%) _____ ml__ 18
(E) Toluene _____ g__ 180

Equipment: 3-neck flask equipped with thermometer, mechanical stirrer, separator designed for removal of lower (aqueous) phase and return of upper (organic) phase, and reflux condenser.

Procedure:
(1) The separator was filled with toluene and materials A, B, C, D and E were charged to the flask and the mixture heated to reflux (ca. 100° C.).
(2) Reflux with removal of aqueous phase was maintained until separation ceased (ca. 120 ml.; batch temp. 101° C.).
(3) At this point the separator was drained of its contents and solvent was distilled directly from the reaction mixture until the solids content was ca. 70% (ca. 600 g. of solvent stripped off). The product was then filtered.

Physical constants:
Viscosity _____ G
Solids, percent _____ 70
Xylene tolerance, cc./10 g. _____ 30

Examples 2–4

(a) To each of three 100-part portions of a 50% copolymer solution in 3/1 xylene/diacetone alcohol (the copolymer was produced by the solution copolymerization of 15.5 parts styrene, 15.5 parts of methyl methacrylate, 60 parts ethyl acrylate, 7 parts acrylamide and 2 parts methacrylic acid) were added an isophthalamide condensate, an adipamide condensate and an azelamide condensate and catalyst as set forth in the following table:

| | Example | | |
|---|---|---|---|
| | 2 | 3 | 4 |
| (a) 50% copolymer solution | 100.0 | 100.0 | 100.0 |
| (b) 50% solution in cyclohexanol of isophthalamide/formaldehyde/cyclohexanol condensate (preparation shown in part (b)) | 17.6 | | |
| (c) 42% solution in cyclohexanol of adipamide/formaldehyde/cyclohexanol condensate (preparation shown in part (b)) | | 21.0 | |
| (d) 30% solution in cyclohexanol of azelamide/formaldehyde/cyclohexanol condensate (preparation shown in part (b)) | | | 29.3 |
| (e) 30% solution in isopropanol of p-toluenesulfonic acid | 0.9 | 0.9 | 0.9 |

Each of these compositions was spread onto cold-rolled steel to a 1.5 mil dry film thickness and baked at 300° F. for 30 minutes. All three gave clear films which had a "2H" pencil hardness and exhibited a lack of tack or stickiness when heated at 180° F. in contact with cheesecloth under a load of 2 lbs./sq. in. However, the coatings of Examples 3 and 4 (i.e., the coatings cured by the adipamide condensate and the azelamide condensate, respectively) had 55 inch-lbs. of reverse impact resistance and softened to an "HB" pencil hardness after one hour's exposure to deionized water. The coating of Example 2 (i.e., the coating cured by the isophthalamide condensate) had 6 inch-lbs. of reverse impact resistance and softened only to an "H" pencil hardness after one hour's exposure to deionized water.

(b) Preparation of diamide condensates isophthalamide/HCHO/cyclohexanol condensate Charge:
(A) Isophthalamide (0.5 mole) _____ g__ 82
(B) Paraformaldehyde (91%) (1.5 moles) _g__ 50
(C) Cyclohexanol (2.5 moles) _____ g__ 250
(D) Formic acid (98%) _____ ml__ 3
(E) Xylene _____ g__ 20

Equipment: same as in Example 1.

Procedure:
(1) The separator was filled with xylene, then materials A, B, C, D and E were charged to the flask and the mixture heated to reflux (116° C.).
(2) Reflux with removal of aqueous phase was maintained until separation of aqueous phase ceased (about 33 ml.; reflux temperature: 162° C.).
(3) At this point, the separator was removed and the apparatus was arranged for reduced pressure distillation. The reaction mixture was then stripped under slightly reduced pressure to a solids content of about 50% (about 20 g. of solvent stripped off).
(4) The product was filtered through filter aid.

Physical constants:
Gardner-Holdt viscosity _____ Z
Solids, percent _____ 49.9
Average molecular weight _____ 600

Adipamide/HCHO/cyclohexanol condensate

Charge:
(A) Adipamide (3 moles) _____ g__ 432
(B) Paraformaldehyde (91%) (12 moles)
                                          g__ 396
(C) Cyclohexanol (18 moles) _____ g__ 1800
(D) Formic acid (98%) _____ ml__ 2.5
(E) Xylene _____ g__ 75

Equipment: same as in Example 1.

Procedure: essentially the same as for Example 1 except that xylene was used in place of toluene and the product was stripped to only 42% solids instead of 70%.

Physical constants:
Viscosity _____ P—
Solids, percent _____ 42

Azelamide/HCHO/cyclohexanol condensate

Charge:
(A) Azelamide (0.645 mole) _____ g__ 120
(B) Paraformaldehyde (91%) (2.6 moles) _g__ 85
(C) Cyclohexanol (3.9 moles) _____ g__ 368
(D) Formic acid (98%) _____ ml__ 1.7
(E) Xylene _____ g__ 60

Equipment: same as for Example 1.

Procedure: same as for Example 1 except that the final resin was reduced to 30% solids with cyclohexanol.

Physical constants:
Viscosity _____ D
Solids, percent _____ 30

Examples 5–7

In each of these examples, 29.8 parts of a 42% solution in cyclohexanol of a condensation product of adipamide, formaldehyde and cyclohexanol (the preparation of which is described in detail in part (b) of Example 3 where cold blended with 100 parts of a 50% copolymer solution as described hereinafter and 0.3 part of a 50% solution of dibutyl acid orthophosphate in n-butanol. In Example 5, the copolymer used in Examples 2–4 was used. In Example 6, the copolymer solution was in 1/1 xylene/diacetone alcohol and was obtained by the solution copolymerization of:

| | Parts |
|---|---|
| Methyl methacrylate | 10.5 |
| Styrene | 15.5 |
| Ethyl acrylate | 65 |
| Methacrylamide | 7 |
| Methacrylic acid | 2 |

In Example 7, the 50% copolymer solution was in diacetone alcohol and was obtained by the solution copolymerization of

| | Parts |
|---|---|
| Methyl methacrylate | 14 |
| Styrene | 14 |
| Ethyl acrylate | 60 |
| Methacryloxy acetamide | 10 |
| Methacrylic acid | 2 |

In each example, the cold-blended mixture was spread onto cold-rolled steel to 1.5 mil dry film thickness and baked at 400° F. for five minutes to give clear, adherent coatings. The following properties were measured at room temperature:

| | Example 5 | Example 6 | Example 7 |
|---|---|---|---|
| (1) Pencil hardness | 2H | 2H | H. |
| (2) Pencil hardness after 15 minutes' exposure to 2-ethoxyethylacetate. | 6B | 6B | 6B. |
| (3) Flexibility over ⅛ inch mandrel | No cracks | No cracks | No cracks. |
| (4) Reverse impact resis. (inch lbs.) | 55 | 50 | 30. |
| (5) Tack when heated at 180° F. in contact with cheesecloth under a load of 2 p.s.i. | No print | No print | Light print. |
| (6) Appearance of clear film | Water white | Water white | Slight yellow cast. |

Example 8

The 50% copolymer solution of this example was in 2/1 xylene/diacetone alcohol and was obtained by the solution copolymerization of 61 parts styrene, 30 parts ethyl acrylate, 7 parts acrylamide, and 2 parts methacrylic acid. The preparation of the adipamide/HCHO/sec-butanol was described in detail in Example 1 herein. An enamel was prepared according to the formulation given below.

Paste prepared on three-roll mill:

| | |
|---|---|
| Titanium dioxide pigment | 100.0 |
| Fifty percent copolymer solution | 100.0 |

Paste letdown:

| | |
|---|---|
| (a) Fifty percent copolymer solution | 98.2 |
| (b) Seventy percent solution in sec-butanol of adipamide-HCHO-sec-butanol condensate | 33.2 |
| (c) Thirty percent solution in isopropanol of p-toluenesulfonic acid | 2.3 |
| (d) Xylene | 86.7 |
| (e) Diacetone alcohol | 86.7 |

Enamel constants:

| | |
|---|---|
| Pigment/binder | 45/55 |
| Acrylic/adipamide condensate | 81/19 |
| Enamel solids at 20 sec., #4 Ford Cup, percent | 44 |

This enamel was sprayed with conventional equipment onto Bonderite 100 panels to a dried film thickness of 1.5 mls.

After a bake in an air oven for 30 minutes at 300° F. the following properties were measured at room temperature: a 4H pencil hardness, excellent flexibility over a ⅛-inch mandrel, high gloss (93 as measured by the 60° Photovolt Gloss Meter), a white visual color, softening to 2B pencil hardness after fifteen minutes' exposure to 2-ethoxyethyl acetate, and good detergent resistance as evidenced by the appearance of only a few #8 blisters (as measured by ASTM D–714–54T photographic standards) after 48 hours' exposure to a 1% Tide (a trade name for a built-alkyl aryl sulfonate detergent) solution in water at 165° F.

Example 9

(a) A 50% copolymer solution in 2/1 Solvesso 100 (a trade name for an aromatic solvent)/diacetone alcohol of composition 91 parts ethyl acrylate, 7 parts acrylamide, and 2 parts methacrylic acid was formulated into an enamel with an isophthalamide condensate and a melamine condensate as indicated below.

Paste prepared on three-roll mill:

| | |
|---|---|
| Titanium dioxide pigment | 100.0 |
| Fifty percent copolymer solution | 100.0 |

Paste letdown:

| | |
|---|---|
| (a) Fifty percent copolymer solution | 60.00 |
| (b) Seventy percent solution in ethanol of isophthalamide - formaldehyde - sec - amyl alcohol condensate (described in part (b)) | 25.7 |
| (c) Fifty percent solution in ¼ xylene/n-butanol of melamide - formaldehyde - n-butanol condensate (described in part (c)) | 4.0 |
| (d) Thirty percent solution in isopropanol of p-toluenesulfonic acid | 2.0 |
| (e) Solvesso 150 (a trade name for an aromatic solvent) | 9.6 |
| (f) Diacetone alcohol | 9.6 |

Enamel constants:

| | |
|---|---|
| Pigment/binder | 45/55 |
| Acrylic/aminoplast | 80/20 |
| Enamel solids at 77 sec., #4 Ford Cup, percent | 64 |

This enamel was applied to tin-plated steel by direct roller coating, using a gelatin roll. The dried film of 0.2 to 0.3 mil thickness was baked at 350° F. for 10 minutes.

This coating had very good hot stacking properties as evidenced by lack of sticking of sheets placed with the coated sides face to face or face to back under a load of 10 p.s.i. at 120° F. for 16 hours. Furthermore, the coating had an 80 gloss (as measured by the 60° Photovolt Gloss Meter) and excellent white color, both after the original bake and an overbake of 30 minutes at 400° F. Very good fabricability of the coating was indicated by the lack of appearance of cracks when the coated tin-plated steel was subjected to sharp right angle bends with coating both on the inside and outside of the bend.

(b) Preparation of isophthalamide/formaldehyde/sec-amyl alcohol

Charge:

| | |
|---|---|
| (A) Isophthalamide (4.5 moles) g | 740 |
| (B) Aqueous formaldehyde (37%) (11.25 moles) g | 927 |
| (C) sec-Amyl alcohol (11.25 moles) g | 990 |
| (D) Formic acid (90%) g | 33 |
| (E) Xylene g | 90 |

Equipment: same as in Example 1

Procedure: The equipment was arranged for total reflux (i.e., the separator was omitted). Materials A, B and D were then charged to the flask and the mixture heated to reflux. Reflux conditions were maintained until the reaction mixture became clear (approx. 30 minutes), then C was charged while still maintaining the batch at reflux. When all of C was added, the batch was permitted to cool a few degrees below reflux temperature while E was charged and the separator was inserted in the vapor arm. The separator was filled with xylene and heating at reflux was resumed. Reflux with removal of aqueous phase was continued until separation of aqueous phase ceased. Solvent was then distilled from the batch under reduced pressure until the batch temperature reached ca. 140° to 160° C. or until the rate of distillate removal was virtually nil (the molten product was quite fluid at the elevated temperatures). Then the batch was diluted to about 70% solids with ethanol and filtered.

Physical contants:
  Viscosity (G.-H. viscosity) _____ P
  Solids, percent _____ 70
  Average mol. wt. _____ 490

(c) Preparation of melamine/formaldehyde/n-butanol condensate 126 parts of melamine, 405.5 parts of formalin (a 37% aqueous solution of formaldehyde) and 370.6 parts of n-butanol are introduced into the apparatus used in part (b) above. The reaction mixture is refluxed to a temperature of about 91° to 93° C. at atmospheric pressure for 6 to 8 hours. The water is removed by azeotropic distillation from the reaction mixture during the reflux operation, using xylene in the separator. The vapor temperature will be about 100° to 105° C. The pressure is lowered sufficiently to reduce the vapor temperature to about 85° to 90° C. and the resin solution concentrated to about 65% solids by vacuum distillation. This solution is diluted with xylene and n-butanol to give a final composition of 10% xylene, 40% n-butanol and 50% resin solids.

Example 10

A 50% copolymer solution in xylene obtained by the solution copolymerization of 22.5 parts methyl methacrylate, 20.5 parts styrene, 45 parts ethyl acrylate, 10 parts betahydroxyethyl methacrylate, and 2 parts methacrylic acid was cold blended with an adipamide/formaldehyde/cyclohexanol condensate (the detailed preparation of which is described in part (b) of Example 3) in the following proportions:

|   | A | B |
|---|---|---|
| (a) Fifty percent copolymer solution | 100.0 | 100.0 |
| (b) Forty-two percent solution in cyclohexanol of adipamide/formaldehyde / cyclohexanol condensate | 24.4 | 24.4 |
| (c) Thirty percent solution in isopranol of the half triethylamine salt of maleic acid | 0.0 | 1.1 |

These compositions were spread onto cold-rolled steel to a 1.5 mil dried film thickness and baked at various temperatures and times.

Fully cured coatings had an H pencil hardness (as measured by graphitic drawing pencils), successfully passed a bend over a 1/8" mandrel, had 30 inch-lbs. of reverse impact resistance (as measured by a Gardner Laboratory Impact Tester), and showed little or no tack when heated at 180° F. in contact with cheesecloth under a load of 2 p.s.i. The films softened to an HB pencil hardness after one hour's exposure to room temperature water.

Full cure was obtained with formulation A, containing no added catalyst, by baking panels at 300° F. for thirty minutes or 350° F. for ten minutes. However, by addition of acid catalyst, as in formulation B, full cure was achieved at baking schedules of 250° F. for ten minutes or 300° F. for five minutes.

Both the catalyzed and uncatalyzed resin blends had good viscosity stability on prolonged storage.

Example 11

The 50% copolymer solution of Example 10 herein was cold blended with an isophthalamide/formaldehyde/ cyclohexanol condensate (the detailed preparation of which is described in part (b) of Example 2) and catalyzed by $Zn(ClO_4)_2$ as described below:

(a) Fifty percent copolymer solution _____ 100.0
(b) Fifty percent solution in cyclohexanol of the isophthalamide/formaldehyde/cyclohexanol condensate _____ 31.0
(c) Twenty percent $Zn(ClO_4)_2$ solution in n-butanol _____ 3.3

This composition was spread onto cold-rolled steel to a 1.5 mil dried film thickness and baked at 250° F. for thirty minutes.

The clear coating so obtained had a 2H pencil hardness, successfully passed a bend over a 1/8" mandrel, had 2 inch-lbs. of reverse impact resistance, showed no tack when heated in contact with cheesecloth under a load of 2 p.s.i., and did not soften when exposed to room temperature water for one hour.

Example 12

A 50% copolymer solution in 9/1 xylene/n-butanol obtained by the solution copolymerization of 15 parts methyl methacrylate, 50 parts butyl acrylate, 30 parts beta-hydroxypropyl methacrylate, and 5 parts methacrylic acid was cold blended separately with a melamine/formaldehyde/n-butanol condensate (described in part (c) of Example 9) and with a combination of an isophthalamide/formaladehyde/sec-amyl alcohol condensate (the preparation of which is described in Example 9) and melamine/formaldehyde/n-butanol condensate. Enamel formulations for these two combinations are described below.

|  | Enamel A | Enamel B |
|---|---|---|
| Paste Prepared on Three-Roll Mill: | | |
| Titanium dioxide pigment | 100.0 | 100.0 |
| Fifty percent copolymer solution | 100.0 | 100.0 |
| Paste Letdown: | | |
| Fifty percent copolymer solution | 110.0 | 110.0 |
| Seventy percent solution in ethanol of isophthalamide formaldehyde sec-amyl alcohol condensate | 57.9 | 0.0 |
| Fifty percent solution in 1/4 xylene/n-butanol of melamine/formaldehyde/n-butanol condensate | 9.0 | 90.0 |
| Xylene | 81.6 | 74.1 |
| n-Butanol | 40.8 | 37.0 |
| Solvesso 100 | 40.8 | 37.0 |
|  | 541.0 | 548.0 |
| Enamel Constants, on Solids Basis: | | |
| Pigment/Binder | 40/60 | 40/60 |
| Acrylic/Aminoplast | 70/30 | 70/30 |
| Enamel solids at 17", #4, Ford cup | 46.3 | 45.6 |

These enamels were sprayed with conventional equipment onto Bonderite 100 panels to a dried film thickness of 1.5 mils and baked in an air oven for thirty minutes at 300° F.

Both of the coatings from enamel A and enamel B had 3H pencil hardness, did not soften after 15 minutes' exposure to xylene or to 2-ethoxyethyl acetate, showed no tack when heated at 180° F. in contact with cheesecloth under a load of 2 p.s.i., had high gloss (a gloss of 90 as measured by the 60° Photovolt Gloss Meter) and good white color, both initially and after a 30-minute overbake at 400° F.

However, the coating from enamel A had flexibility over a 1/2-inch mandrel and good knife adhesion while the coating from enamel B showed severe cracking when bent over a 1/2-inch mandrel and had poor knife adhesion.

Example 13

A 50% copolymer solution in 3/1 Solvesso 100/2-ethoxyethyl acetate obtained by the solution copolymerization of 24 parts styrene, 67 parts ethyl acrylate, 7 parts beta-hydroxypropyl methacrylate and 2 parts methacrylic acid was formulated into an enamel with an isophthalamide-based resin/melamine-based resin crosslinker as indicated below:

Paste prepared on three-roll mill:
- Titanium dioxide pigment _____ 130.0
- Fifty percent solution of beta-hydroxypropyl methacrylate polymer _____ 70.0

Paste letdown:
- (a) Fifty percent solution of beta-hydroxypropyl methacrylate polymer _____ 164.0
- (b) Seventy percent solution in ethanol of isophthalamide/formaldehyde/sec-amyl alcohol condensate (the preparation of which is described in part (b) of Example 9) ____ 16.7
- (c) Fifty percent solution in ¼ xylene/n-butanol of melamine/formaldehyde/n-butanol condensate (the preparation of which is described in part (c) of Example 9) _____ 2.6
- (d) Thirty percent solution in isopropanol of p-toluene sulfonic acid _____ 0.4
- (e) Cyclohexanol _____ 75.0

458.7

Enamel constants, on solids basis:
- Pigment/Binder _____ 50/50
- Acrylic/aminoplast _____ 90/10
- Enamel solids at 55 sec., #4 Ford cup, percent _____ 56.6

This enamel was applied to tin-plated steel, aluminum sheet, and black plate by direct roller coating, using a gelatin roll. The dried films of 0.2 to 0.3 mil thickness were baked at 350° F. for 10 minutes.

These coatings had very good hot stacking properties as evidenced by lack of sticking of sheets placed face to face or face to back under a load of 10 p.s.i. at 120° F. for 16 hours. Furthermore, the coatings had an 80 gloss (as measured by the 60° Photovolt Gloss Meter) and excellent white color, both after the original bake and an overbake of 30 minutes at 400° F. Moreover, the coatings were able to withstand severe fabrication without cracking (as in fabricating 28 mm. knurled and threaded screw caps from the coated sheets) and the severely fabricated pieces were able to resist one hour of dry heat at 250° F., or one hour of superheated steam at 250° F., without showing cracks or peeling failure.

While the examples illustrate the invention with reference to combinations of N,N'-bis(alkoxymethyl)diamide condensate with either an amide resin or a free hydroxy-containing ester resin as described above, the invention is not intended to be limited thereto. Thus, combinations of these materials with one another or other resinous materials may be used including alkyd resins as described in the above-noted application Serial No. 327,105. In addition, the amide-containing monomers and the free hydroxy ester monomers may be copolymerized.

While monomeric diamide condensates may be used to cross-link the amide and/or hydroxy ester resins, it is preferred that the condensate have a molecular weight greater than that of the N,N'-bis(alkoxymethyl)diamide corresponding to the alcohol from which the product is made, preferably in the range of about 400 to about 1000, the limits varying, depending on the alcohol and the diamide.

Particularly interesting is the adipamide/formaldehyde/ isopropanol condensate produced as described. This condensate is completely water-soluble. So far as is known, isopropanol is unique in producing this result. Even dimethylol adipamide itself is not very water-soluble; neither is the methoxymethyl derivative. The adipamide/ formaldehyde/isopropanol condensate is particularly useful as a crosslinker for thermosetting acrylic latexes. Such a system used in nonwoven fabric applications has an unusual combination of freedom from discoloration (i.e., little or no chlorine pickup) and superior stability.

It is to be understood that changes and variations may be made without departing from the spirit and scope of the invention as defined in the appended claims.

What is claimed is:

1. A composition adapted to be used for coating and impregnating purposes comprising a solution in an organic solvent of a mixture of
   (A) about 70 to 95% by weight of a water-insoluble addition copolymer of monoethylenically unsaturated molecules comprising at least one derivative of an alpha,beta-mono-ethylenically unsaturated acid, said derivative being selected from the group consisting of
      (1) amides having a group of the formula

wherein R is selected from the group consisting of H, alkyl and hydroxyalkyl groups having one to four carbon atoms and alkoxyalkyl groups having two to six carbon atoms, and
      (2) free hydroxyl-containing esters, and
   (B) about 30 to 5% by weight of an alkylated condensate of formaldehyde and a diamide of a dicarboxylic acid having four to twelve carbon atoms obtained by alkylation with at least one alcohol having one to eight carbon atoms.

2. A composition according to claim 1 wherein the water-insoluble addition copolymer contains from about 3–20% by weight of said amide.

3. A composition according to claim 2 wherein (B) is a mixture of
   (1) an alkylated condensate of formaldehyde and a diamide of a dicarboxylic acid having four to twelve carbon atoms obtained by alkylation with at least one alcohol having one to eight carbon atoms and
   (2) an alkylated melamine/formaldehyde condensate obtained by alkylation with at least one alcohol having one to six carbon atoms,
the relative proportions between (1) and (2) being about 70–95% by weight of (1) and 30 to 5% by weight of (2).

4. A composition according to claim 2 in which the alkylated condensate has a molecular weight in the range of about 400 to about 1000.

5. A composition according to claim 2 wherein the alkylated condensate has the formula

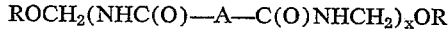

wherein
   A is a meta-phenylene group,
   R is at least one member selected from the group consisting of H and the radicals of alcohols having from one to eight carbon atoms, and
   x is a number having a value of 1.5 to 3,
R being an aforesaid alcohol radical in at least a portion of the condensate.

6. A composition according to claim 5 wherein R is cyclohexyl.

7. A composition according to claim 5 wherein R is 2-ethylhexyl.

8. A composition according to claim 5 wherein R is isooctyl.

9. A composition according to claim 2 wherein the alkylated condensate has the formula

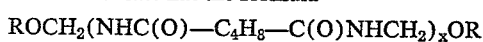

wherein
   R is at least one member selected from the group consisting of H and the radicals of alcohols having from one to eight carbon atoms, and
   x is a number having a value of 1.5 to 3,
R being an aforesaid alcohol radical in at least a portion of the condensate.

10. A composition according to claim 9 wherein R is isopropyl.

11. A composition according to claim 1 wherein the water-insoluble addition copolymer contains about 5 to 40% by weight of said free hydroxyl-containing ester.

12. A composition according to claim 11 wherein (B) is a mixture of
   (1) an alkylated condensate of formaldehyde and a diamide of a dicarboxylic acid having four to twelve carbon atoms obtained by alkylation with at least one alcohol having one to eight carbon atoms and
   (2) an alkylated melamine/formaldehyde condensate obtained by alkylation with at least one alcohol having one to six carbon atoms, the relative proportions between (1) and (2) being about 70–95% by weight of (1) and 30 to 5% by weight of (2).

13. A composition according to claim 11 wherein the alkylated condensate has a molecular weight in the range of about 400 to about 1000.

14. A composition according to claim 11 wherein the alkylated condensate has the formula $$ROCH_2(NHC(O)-A-C(O)NHCH_2)_xOR$$

wherein
   A is a meta-phenylene group,
   R is at least one member selected from the group consisting of H and the radicals of alcohols having from one to eight carbon atoms, and
   x is a number having a value of 1.5 to 3,
R being an aforesaid alcohol radical in at least a portion of the condensate.

15. A composition according to claim 14 wherein R is cyclohexyl.

16. A composition according to claim 14 wherein R is 2-ethylhexyl.

17. A composition according to claim 14 wherein R is isooctyl.

18. A composition according to claim 11 wherein the alkylated condensate has the formula $$ROCH_2(NHC(O)-C_4H_8-C(O)NHCH_2)_xOR$$

wherein
   R is at least one member selected from the group consisting of H and the radicals of alcohols having from one to eight carbon atoms, and
   x is a number having a value of 1.5 to 3,
R being an aforesaid alcohol radical in at least a portion of the condensate.

19. A composition according to claim 18 wherein R is isopropyl.

References Cited

UNITED STATES PATENTS 3,342,893   9/1967   Emmons et al. _____ 260—850

SAMUEL H. BLECH, Primary Examiner

C. J. SECCURO, Assistant Examiner

U.S. Cl. X.R.

117—132, 148, 155; 260—31.4, 32.8, 33.4, 33.6, 39, 41. 834, 839, 844, 849, 853, 855, 856; 260—15, 17